(12) United States Patent
Lin et al.

(10) Patent No.: US 8,864,355 B2
(45) Date of Patent: Oct. 21, 2014

(54) LIGHT GUIDE DEVICE AND ILLUMINATION MODULE USING THE SAME THEREOF

(71) Applicants: Dongguan Masstop Liquid Crystal Display Co., Ltd., Dongguan (CN); Wintek Corporation, Taichung (TW)

(72) Inventors: Ming-Chuan Lin, Taichung (TW); Chin-Liang Chen, Taichung (TW); Zhi-Ting Ye, Miaoli County (TW)

(73) Assignees: Dongguan Masstop Liquid Crystal Display Co., Ltd., Dongguan, Guangdong Province (CN); Wintek Corporation, Taichung (TW)

( * ) Notice: Subject to any disclaimer, the term of this patent is extended or adjusted under 35 U.S.C. 154(b) by 146 days.

(21) Appl. No.: 13/706,444

(22) Filed: Dec. 6, 2012

(65) Prior Publication Data

US 2013/0163280 A1    Jun. 27, 2013

(30) Foreign Application Priority Data

Dec. 26, 2011   (TW) ................ 100148690

(51) Int. Cl.
*F21V 7/04*   (2006.01)
*H01L 33/00*   (2010.01)
*F21V 8/00*   (2006.01)

(52) U.S. Cl.
CPC ............ *G02B 6/0001* (2013.01); *G02B 6/001* (2013.01)
USPC ...................................... 362/555

(58) Field of Classification Search
CPC ..... G02B 6/0001; G02B 6/0008; G02B 6/001
USPC ...................................... 362/555
See application file for complete search history.

(56) References Cited

U.S. PATENT DOCUMENTS 7,458,708 B2 * 12/2008 Sheng ............... 362/551

FOREIGN PATENT DOCUMENTS

| CN | 201731428 U | 2/2011 |
| JP | 2006-31941 A | 2/2006 |

OTHER PUBLICATIONS

CN Office Action dated Jun. 3, 2014.
Partial English translation of CN Office Action dated Jun. 3, 2014.
Full English (machine) translation of CN201731428U (Published Feb. 2, 2011).
English Abstract translation of JP2006-31941A (Published Feb. 2, 2006).

* cited by examiner

*Primary Examiner* — Jason Moon Han
(74) *Attorney, Agent, or Firm* — McClure, Qualey & Rodack, LLP

(57) ABSTRACT

An illumination device comprising a light guide bar, a light source and a reflective sleeve is provided. The light guide bar comprises a first end surface, a second end surface, and a cylindrical surface. The cylindrical surface is disposed between the first end surface and the second end surface and has a light-emitting surface and a reflective surface. The light source is disposed at the outside of the first end surface of the light guide bar. The reflective sleeve covers the second end surface of the light guide bar and has a reflective cavity, which tapers inward to form a vertex angle. A part of the incident light of the light source is reflected to the light-emitting surface via the reflective surface by the reflective cavity or directly reflected to the light-emitting surface by the reflective cavity.

8 Claims, 6 Drawing Sheets

LIGHT GUIDE DEVICE AND ILLUMINATION MODULE USING THE SAME THEREOF

This application claims the benefit of Taiwan application Serial No. 100148690, filed Dec. 26, 2011, the subject matter of which is incorporated herein by reference.

BACKGROUND OF THE INVENTION

1. Field of the Invention

The invention relates in general to a light guide device, and more particularly to an edge-lit light guide device and an illumination device using the same thereof.

2. Description of the Related Art

Currently, the issue of light-emitting efficiency needs to be resolved so that conventional T5/T8 fluorescent lamps can be replaced with shorter edge-lit LED light guide bars.

Referring to FIG. 1A, a schematic diagram of a generally known edge-lit LED illumination device 1-1 is shown. As indicated in FIG. 1A, the illumination device 1-1 comprises a light source 12 and a light guide bar 102. The light source 12 is disposed at the outside of an end surface 1021 of the light guide bar 102. When a light beam $L_{11}$ of the light source 12 enters the light guide bar 102, at least ±2° of the light will be leaked through another end surface 1022 of the light guide bar 102 and cannot be emitted out from the light-emitting surface 1023a of the light guide bar 102. Consequently, the light-emitting efficiency of the illumination device 1-1 is poor.

Referring to FIG. 1B, a schematic diagram of a generally known edge-lit LED illumination device 1-2 is shown. The illumination device 1-2 of FIG. 1B comprises a light source 12 and a light guide bar 102. The light source 12 of FIG. 1B is the same with the light guide bar 102 and FIG. 1A, and the similarities are not repeated here. It is noted that a reflective planar plate P is disposed on another end surface 1022 of the light guide bar 102 of the illumination device 1-2. When the light beam $L_{13}$ of the light source 12 proceeds to the underneath of the reflective planar plate P via the inside of the light guide bar 102, the light beam $L_{13}$ is reflected to the light-emitting surface by the reflective plate P and then is emitted to the outside from the light-emitting surface. Thus, the light beam will not be leaked via another end surface 1022 of the light guide bar 102. However, when the light beam $L_{12}$ of the light source 12 proceeds to the top of the reflective planar plate P via the inside of the light guide bar 102, the light beam $L_{12}$ is reflected to the end surface 1021 by the reflective planar plate P and light leakage will occur. The light guide device of the illumination device 1-2 still cannot effectively resolve the problem of light leakage, and the issue of light-emitting efficiency still has plenty of room to improve.

SUMMARY OF THE INVENTION

The invention is directed to a light guide device and an illumination device using the same thereof. The special structure of the light guide device resolves the light leakage of the edge-lit light source and increases the light-emitting efficiency.

According to an embodiment of the present invention, an illumination device comprising a light guide bar, a light source and a reflective sleeve is provided. The light guide bar comprises a first end surface, a second end surface, and a cylindrical surface. The cylindrical surface is disposed between the first end surface and the second end surface and has a light-emitting surface and a reflective surface. The light source is disposed adjacent to the outside of the first end surface of the light guide bar. The reflective sleeve covers the second end surface of the light guide bar and has a reflective cavity, which tapers inward to form a vertex angle. A part of the incident light of the light source is reflected to the light-emitting surface via the reflective surface by the reflective cavity or directly reflected to the light-emitting surface by the reflective cavity.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1A:
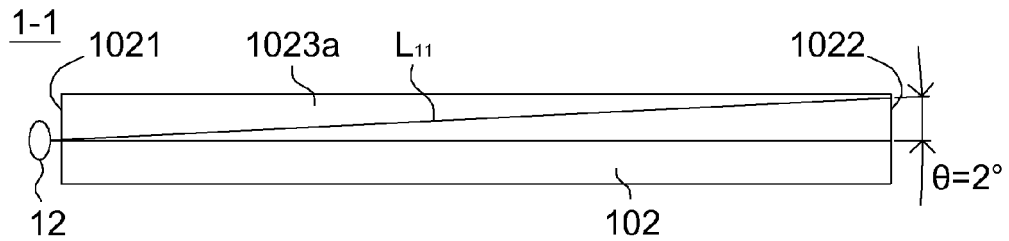
FIG. 1A shows a schematic cross-sectional view of an illumination device lacking a reflective plate.
Figure 1B:
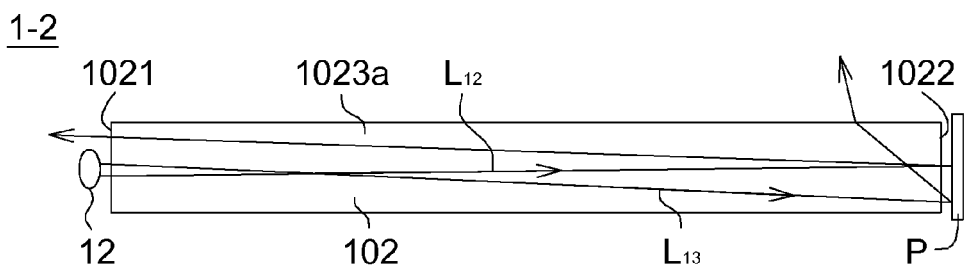
FIG. 1B shows a schematic cross-sectional view of an illumination device having a reflective plate.
Figure 2A:
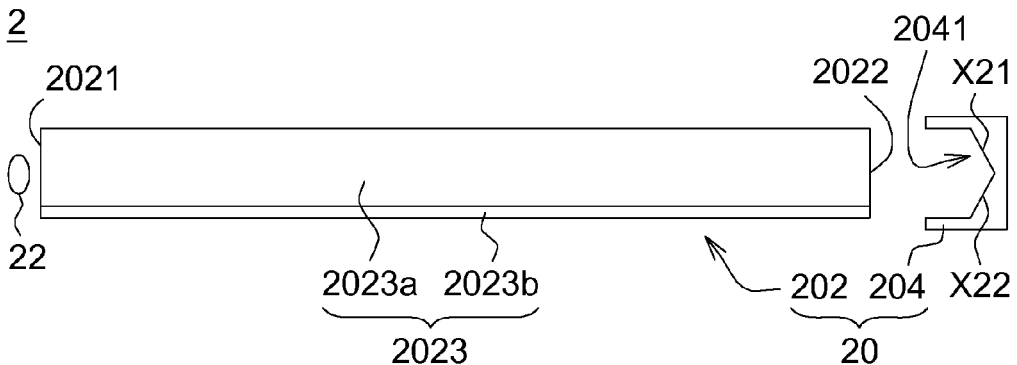
FIG. 2A shows a schematic cross-sectional explosion diagram of an illumination device according to an embodiment of the invention.

Referring to FIG. 2A, a schematic cross-sectional explosion diagram of an illumination device according to a first embodiment of the invention. As indicated in FIG. 2A, the illumination device 2 comprises a light guide device 20 and a light source 22. The light guide device 20 comprises a light guide bar 202 and a reflective sleeve 204. The light guide bar 202 comprises a first end surface 2021, a second end surface 2022, and a cylindrical surface 2023. In the present embodiment, both the first end surface 2021 and the second end surface 2022 are substantially a plane surface, and the cylindrical surface 2023 is substantially a cylindrical surface. The second end surface 2022 is opposite to the first end surface 2021, and the second end surface 2022 is substantially parallel to the first end surface 2021. The cylindrical surface 2023 is disposed between the first end surface 2021 and the second end surface 2022. The cylindrical surface 2023 comprises a light-emitting surface 2023a and a reflective surface 2023b. The reflective surface 2023b is formed by applying surface treatment on the bottom of the cylindrical surface 2023 or directly pasting a reflective layer material on the bottom of the cylindrical surface 2023. The light source 22 is disposed adjacent to the outside of the first end surface 2021 of the light guide bar 202. The reflective sleeve 204 covers the second end surface 2022 of the light guide bar 202, and comprises a reflective cavity 2041 having a first reflective area X21 and a second reflective area X22.

Figure 2B:
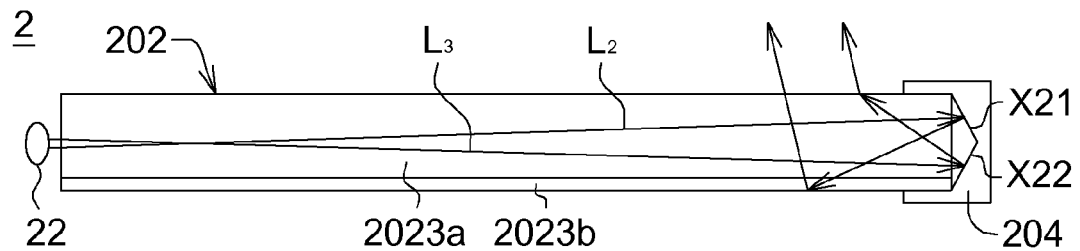
FIG. 2B shows a schematic cross-sectional view of an illumination device according to an embodiment of the invention.

Referring to FIG. 2B, a schematic cross-sectional view of an illumination device 2 according to a first embodiment of the invention. The incident light of the present embodiment is exemplified by incident lights with different angles. As indicated in FIG. 2B, after a light beam $L_2$ of the light source 22 incidents to the first reflective area X21 of the reflective cavity 2041 (illustrated in FIG. 2A) in a direction facing the first reflective area X21, the light beam $L_2$ is reflected to the reflective surface 2023b by the first reflective area X21. Then, the light beam $L_2$ is reflected to the light-emitting surface 2023a by the reflective surface 2023b and is then emitted to the outside from the light-emitting surface. After another light beam $L_3$ of the light source 22 incidents to the second reflective area X22 of the reflective cavity 2041 (illustrated in FIG. 2A) in a direction facing the second reflective area X22, the light beam $L_3$ is reflected to the light-emitting surface 2023a by the second reflective area X22 directly and is then emitted to the outside from the light-emitting surface. In the present embodiment, the light beam $L_2$ and the light beam $L_3$ which incident to the reflective cavity 2041 are substantially within the incident angle range of +2~-2 degrees.

Figure 2C:
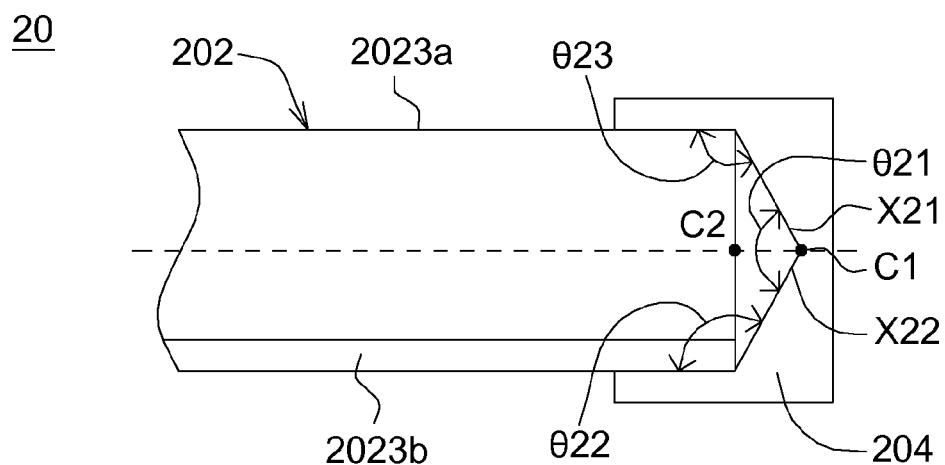
FIG. 2C shows a schematic partial enlarged cross-sectional view of a light guide bar and a reflective sleeve according to an embodiment of the invention.

Referring to FIG. 2C, a partial enlarged cross-sectional view of a light guide device 20 according to the first embodiment of the invention is shown. As indicated in FIG. 2C, a vertex angle $\Theta_{21}$ is contained between the first reflective area X21 and the second reflective area X22, a first angle $\Theta_{22}$ is contained between the second reflective area X22 and the reflective surface 2023b, and a second angle $\Theta_{23}$ is contained between the first reflective area X21 and the light-emitting surface 2023a. The vertex C1 between the first reflective area X21 and the second reflective area X22 is symmetric with respect to the center point C2 of the second end surface 2022 (illustrated in FIG. 2A) of the light guide bar 202. That is, the vertex angle $\Theta_{21}$ contained between the first reflective area X21 and the second reflective area X22 corresponds to the center point C2 of the second end surface 2022.

In the present embodiment, the first angle $\Theta_{22}$ is larger than 90 degrees, the second angle $\Theta_{23}$ is substantially equal to the first angle $\Theta_{22}$, and preferably, the vertex angle $\Theta_{21}$ is substantially between 100~170 degrees, but the invention is not limited thereto. The range of the vertex angle $\Theta_{21}$ enables the light beam to be guided to the light-emitting surface more effectively, not only improving the light-emitting efficiency of the illumination device 2 but also making the emitted light more uniformly distributed. Besides, considering the influence of process tolerance factors, the angle mentioned above covers the error range understandable to anyone who is skilled in the art of the invention.

Figure 2D:
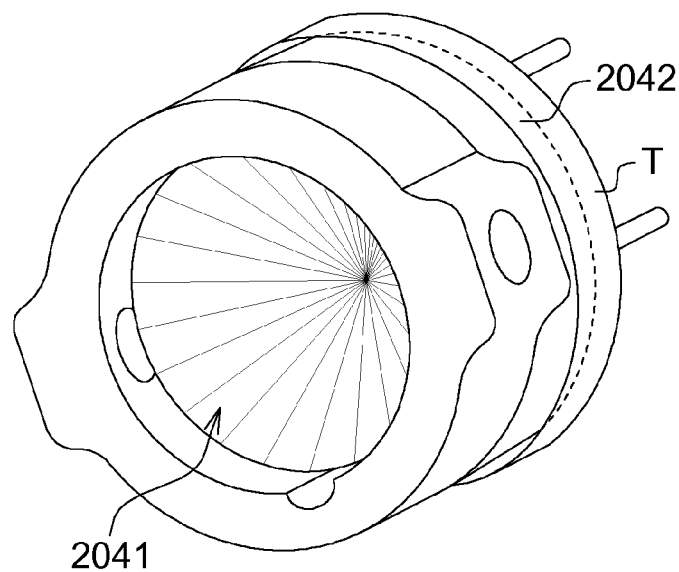
FIGS. 2D-2E show schematic diagrams of a reflective sleeve according to an embodiment of the invention.
Figure 2E:
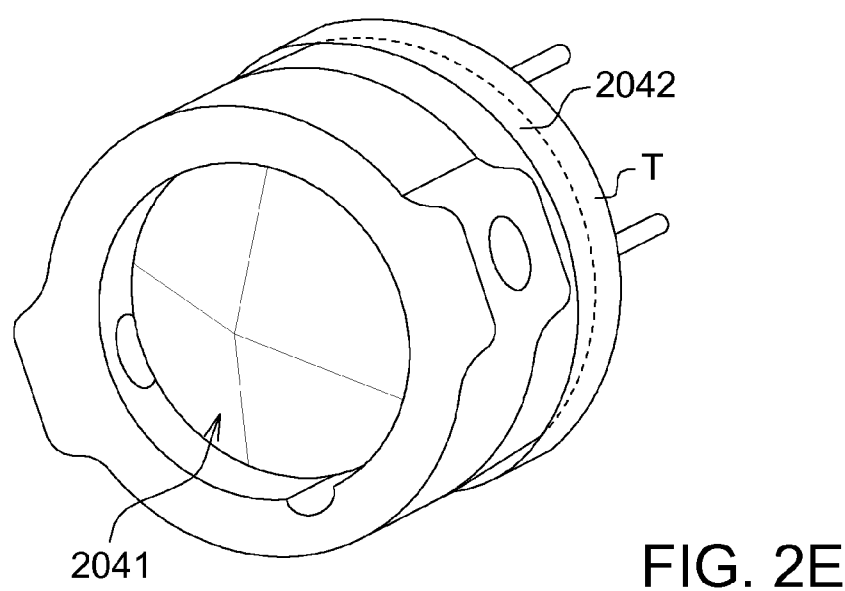

FIGS. 2A~2C only illustrate cross-sectional views of the reflective sleeve 204. In practical application, the cavity structure of the reflective sleeve 204 may comprise a conical surface, an angular cone, a serrated surface, a wave surface or a hemispherical surface, and the invention is not limited thereto. FIGS. 2D~2E illustrate the reflective sleeve 204 with different types of reflective cavity 2041. For example, the reflective cavity 2041 of the reflective sleeve 204 of FIG. 2D has a conical surface, but the reflective cavity 2041 of FIG. 2E has an angular cone. In the present embodiment, the reflective cavity 2041 of the reflective sleeve 204 may be formed by a mirror material, a metal coating material, a reflective type polycarbonate (PC) or any other materials having high reflectivity and low absorptivity. Preferably, the reflective cavity 2041 may be formed by reflective polycarbonate (PC) having high reflectivity and low absorptivity for increasing reflection efficiency. As indicated in FIGS. 2D~2E, the reflective sleeve 204 has a tail end 2042 corresponding to a lamp cap T to which the tail end 2042 is sleeve-jointed. Thus, the light guide device 20 may be directly installed on the lamp base commonly seen in the market.

Second Embodiment

Figure 3A:
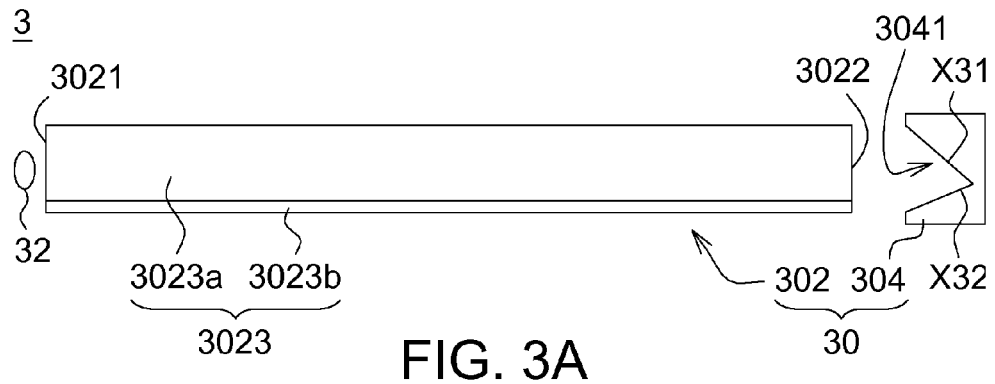
FIG. 3A shows a schematic cross-sectional explosion diagram of an illumination device according to an embodiment of the invention.
Figure 3B:
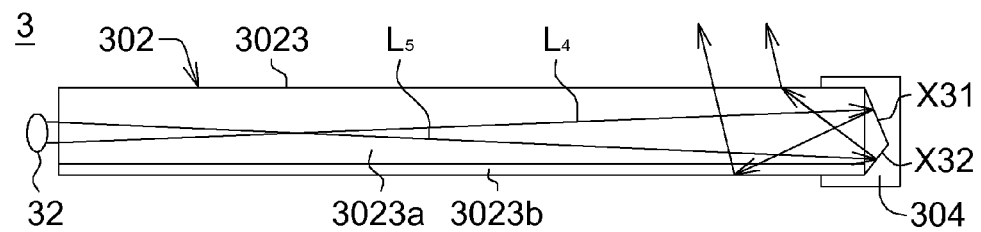
FIG. 3B shows a schematic cross-sectional view of an illumination device according to an embodiment of the invention.

Referring to FIG. 3A~3B. FIG. 3A shows a schematic cross-sectional explosion diagram of an illumination device 3 according to a second embodiment of the invention. FIG. 3B shows a cross-sectional diagram of an illumination device 3 according to the second embodiment of the invention. As indicated in FIG. 3A~3B, the illumination device 3 comprises a light guide device 30 and a light source 32. The light guide device 30 comprises a light guide bar 302 and a reflective sleeve 304. The light guide bar 302 comprises a first end surface 3021, the second end surface 3022 and a cylindrical surface 3023. In the present embodiment, the first end surface 3021 and the second end surface 3022 is substantially a planar end surface, the cylindrical surface 3023 is substantially a cylindrical surface. The cylindrical surface 3023 comprises a light-emitting surface 3023a and a reflective surface 3023b. The reflective surface 3023b is formed by applying surface treatment on the bottom of the cylindrical surface 3023 or directly pasting a reflective layer material on the bottom of the cylindrical surface 3023 The reflective sleeve 304 comprises a reflective cavity 3041 having a first reflective area X31 and a second reflective area X32. The light source 32 and the light guide bar 302 are similar to the light source 22 and the light guide bar 202 of the first embodiment, and the similarities are not repeated here. The reflective sleeve 304 covers the second end surface 3022 of the light guide bar 302, and comprises a reflective cavity 3041 having a first reflective area X31 and a second reflective area X32.

Figure 3C:
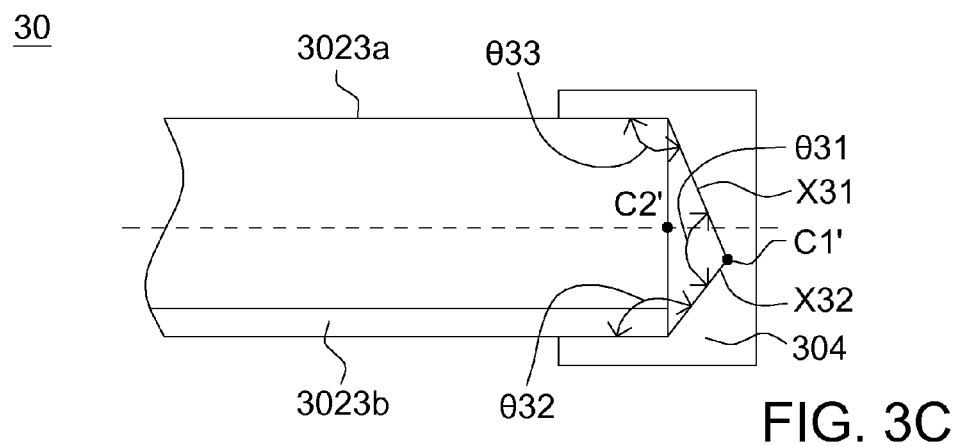
FIG. 3C shows a schematic partial enlarged cross-sectional view of a light guide bar and a reflective sleeve according to an embodiment of the invention.

It is noted that the reflective cavity 3041 of the present embodiment is an asymmetric structure. To put it in greater details, the first reflective area X31 and the second reflective area X32 are asymmetric with respect to the second end surface 3022 of the light guide bar 302. As indicated in FIG. 3C, the vertex angle $\Theta_{31}$ contained between the first reflective area X31 and the second reflective area X3 is biased from the center point C2' of the second end surface 3022 (illustrated in FIG. 3A). The distance from the vertex C1' to the light-emitting surface 3023a is larger than the distance from the vertex C1' to the reflective surface 3023b, such that more incident light beams are reflected to the reflective surface 3023b by the first reflective area X31 and then are reflected to the light-emitting surface 3023a to emit from the light emitting surface by the reflective surface 3023b, hence increasing the light emitting efficiency.

As indicated in FIG. 3B, incident lights with different angles are taken for example. After a light beam $L_4$ of the light source 32 incident to the first reflective area X31 of the reflective cavity 3041 (illustrated in FIG. 3A) in a direction facing the first reflective area X31, the light beam $L_4$ is reflected to the reflective surface 3023b by the first reflective area X31. Then, the light beam $L_4$ is reflected to the light-emitting surface 3023a by the reflective surface 3023b and is then emitted to the outside from the light-emitting surface. After another light beam $L_5$ of the light source 32 incidents to the second reflective area X32 of the reflective cavity 3041 (illustrated in FIG. 3A) in a direction facing the second reflective area X32, the light beam $L_5$ is reflected to the light-emitting surface 3023a by the second reflective area X32 and is then emitted to the outside from the light-emitting surface 3023a. In the present embodiment, the light beam $L_4$ and the light beam $L_5$ which incident to the reflective cavity 3041 are substantially within the incident angle range of +2 degrees~–2 degrees.

Referring to FIG. 3C, a schematic diagram of a light guide device 30 according to a second embodiment of the invention is shown. As indicated in FIG. 3C, a vertex angle $\Theta_{31}$ is contained between the first reflective area X31 and the second reflective area X32, a first angle $\Theta_{32}$ is contained between the second reflective area X32 and the reflective surface 3023b, and a second angle $\Theta_{33}$ is contained between the first reflective area X31 and the light-emitting surface 3023a. In the present embodiment, the vertex angle $\Theta_{31}$ preferably ranges between 100~170 degrees, the range of the vertex angle $\Theta_{31}$ enables the light beam to be guided to the light-emitting surface more effectively, not only improving the light-emitting efficiency of the illumination device 3 but also making the emitted light more uniformly distributed. Besides, the first angle $\Theta_{32}$ is larger than 90 degrees, and the second angle $\Theta_{33}$ is substantially smaller than the first angle $\Theta_{32}$. Considering the influence of process tolerance factors, the angle mentioned above covers the error range to the knowledge of anyone who is skilled in the art of the invention.

Figure 3D:
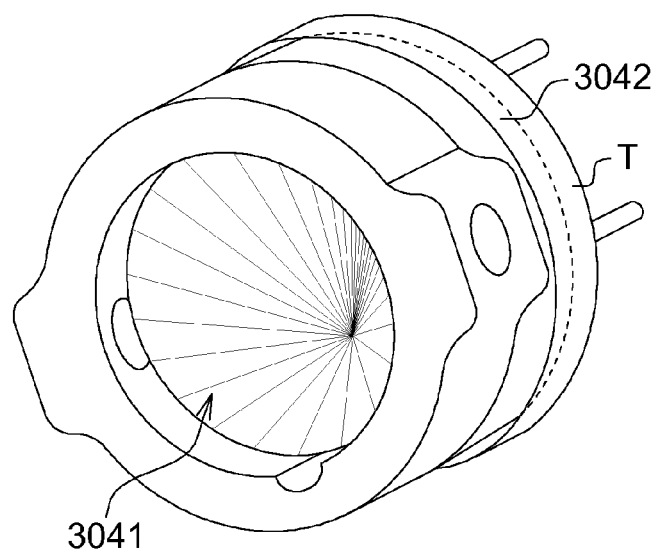
FIG. 3D~3E show schematic diagrams of a reflective sleeve according to an embodiment of the invention.
Figure 3E:
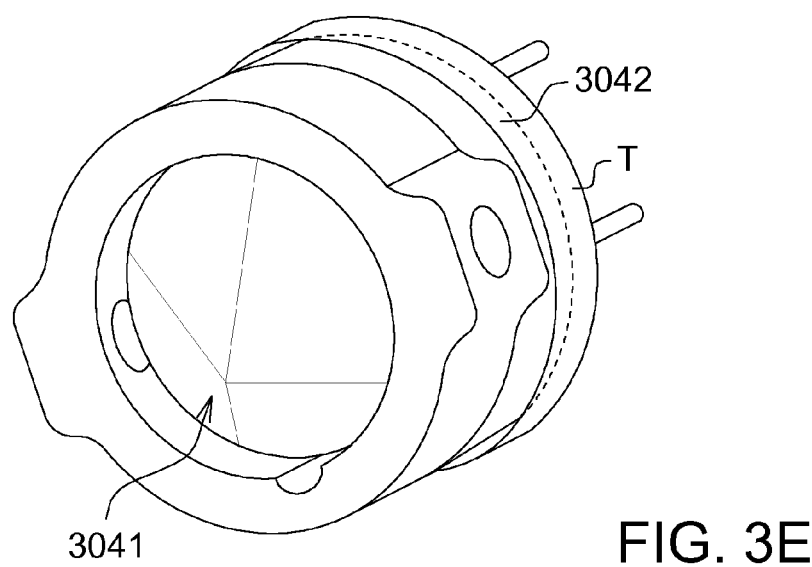

FIGS. 3A~3C only illustrate schematic cross-sectional views of the reflective sleeve 304. In practical application, the cavity of the reflective sleeve 304 may comprise a conical surface, an angular cone, a serrated surface, a wave surface or a hemispherical surface, and the invention is not limited thereto. FIGS. 3D~3E illustrate the reflective sleeve 304 with different types of reflective cavity 3041. For example, the reflective cavity 3041 of the reflective sleeve 304 of FIG. 3D is an asymmetric conical surface, but the reflective cavity 3041 of FIG. 3E is an asymmetric angular cone. The reflective cavity 3041 and the reflective cavity 2041 may be formed by the same material, and the similarities are not repeated here. As indicated in FIGS. 3D~3E, the reflective sleeve 304 has a tail end 3042 corresponding to a lamp cap T to which the tail end 3042 is sleeve-jointed. Thus, the light guide device 30 may be directly installed on the lamp base commonly seen in the market.

Figure 4:
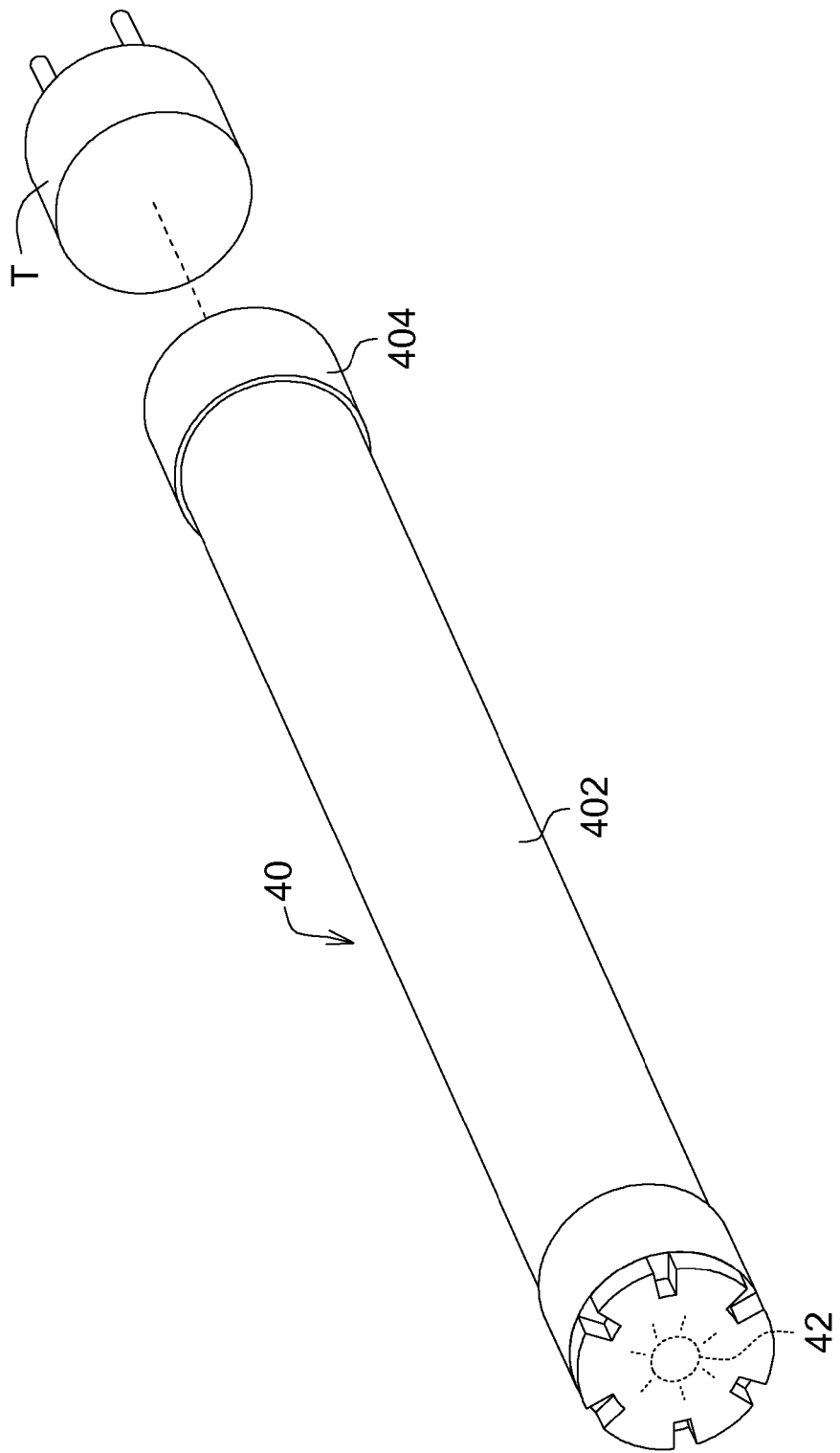
FIG. 4 shows a schematic diagram of an illumination device according to an embodiment of the invention.

Application of illumination device of the above embodiments:

Referring to FIG. 4, a schematic diagram of an illumination device 4 according to an embodiment of the invention is shown. The illumination device 4 comprises a light guide device 40, a light source 42, and a lamp cap T. The light guide device 40 comprises a light guide bar 402 and a reflective sleeve 404. The light guide bar 402 may be realized by the light guide bar disclosed in any of the above embodiments. As indicated in FIG. 4, the light guide bar 402 is such as a cylindrical or angular light guide pillar, and the invention is not limited thereto. The reflective sleeve 404 may be realized by the reflective sleeve of any of the above embodiments. In the present embodiment, the illumination device 4 further comprises a lamp cap T covering the tail of the reflective sleeve 404. Through the connection provided by the lamp cap T, the illumination device 4 is disposed on a lamp base (not illustrated).

To summarize, the illumination device of the above embodiments of the invention has a reflective sleeve. The reflective cavity of the reflective sleeve enables the light of the light source to be uniformly emitted to the outside and resolves the light leakage. Particularly, the illumination device of the above embodiments of the invention may increase the light-emitting efficiency to be larger than or close to 79%. In comparison to the light-emitting efficiency of the illumination device lacking the light guide bar of the reflective sleeve (which has about 41.5% light-emitting efficiency) and the light-emitting efficiency of the illumination device whose light guide bar has a reflective plate only (which has a light-emitting efficiency smaller than 71%), the light-emitting efficiency of the illumination device of the above embodiments of the invention is largely improved. In addition, the reflective sleeve of the above embodiments of the invention covers the outer end of the light guide bar so that the light guide bar may be formed by ejection molding without performing further treatment on the light guide bar. Therefore, the manufacturing process can be simplified. Moreover, the reflective sleeve has a tail corresponding to the lamp cap, such that the lamp cap directly covers the tail of the reflective sleeve. Thus, by using the lamp cap to cover the reflective sleeve, the illumination device or the light guide device of the above embodiments of the invention may be directly installed on a lamp base commonly seen in the market.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An illumination device, comprising:
   a light guide bar, comprising:
      a first end surface;
      a second end surface opposite to the first end surface; and
      a cylindrical surface disposed between the first end surface and the second end surface, wherein the cylindrical surface comprises a light-emitting surface and a reflective surface;
   a light source disposed adjacent to the outside of the first end surface of the light guide bar; and
   a reflective sleeve covering the second end surface of the light guide bar and having a reflective cavity which tapers inward to form a vertex angle, wherein a part of the incident light of the light source is reflected to the light-emitting surface via the reflective surface by the reflective cavity or directly reflected to the light-emitting surface by the reflective cavity.

2. The illumination device according to claim 1, wherein the reflective cavity comprises a first reflective area and a second reflective area.

3. The illumination device according to claim 1, wherein the vertex angle is biased from the center of the second end surface of the light guide bar.

4. The illumination device according to claim 1, wherein the vertex angle corresponds to the center of the second end surface of the light guide bar.

5. The illumination device according to claim 1, further comprises a lamp cap covering a tail of the reflective sleeve.

6. The illumination device according to claim 1, wherein the second end surface is a planar end surface.

7. The illumination device according to claim 1, wherein the incident angle of the part of incident light ranges between +2 degrees to –2 degrees.

8. The illumination device according to claim 1, wherein the vertex angle ranges between 100 degrees to 170 degrees.

* * * * *